US009840747B2

(12) United States Patent
Shen et al.

(10) Patent No.: US 9,840,747 B2
(45) Date of Patent: Dec. 12, 2017

(54) WALL MEMBER USEFUL IN QUENCHING

(71) Applicant: Rolls-Royce Corporation, Indianapolis, IN (US)

(72) Inventors: Gangshu Shen, Carmel, IN (US); Nathan J. Cooper, Avon, IN (US); Nathan Wesley Ottow, Indianapolis, IN (US); Robert Louis Goetz, Indianapolis, IN (US); John F. Matlik, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 917 days.

(21) Appl. No.: 14/133,299

(22) Filed: Dec. 18, 2013

(65) Prior Publication Data

US 2014/0230972 A1 Aug. 21, 2014

Related U.S. Application Data

(60) Provisional application No. 61/767,123, filed on Feb. 20, 2013.

(51) Int. Cl.
| | |
|---|---|
| *C21D 1/18* | (2006.01) |
| *C21D 1/62* | (2006.01) |
| *C21D 1/63* | (2006.01) |
| *B29C 71/02* | (2006.01) |

(Continued)

(52) U.S. Cl.
CPC .............. *C21D 1/18* (2013.01); *B29C 71/02* (2013.01); *C21D 1/62* (2013.01); *C21D 1/63* (2013.01); *C21D 1/64* (2013.01); *C21D 11/005* (2013.01)

(58) Field of Classification Search
None
See application file for complete search history.

(56) References Cited

U.S. PATENT DOCUMENTS

| | | | |
|---|---|---|---|
| 2,305,811 A | 12/1942 | Oeckl | |
| 2,890,975 A | 6/1959 | Lenz | |
| 3,470,624 A | 10/1969 | Plotkowiak | |

(Continued)

FOREIGN PATENT DOCUMENTS

| | | |
|---|---|---|
| DE | 10117987 A1 | 10/2002 |
| EP | 1531185 A1 | 5/2005 |
| WO | 0018972 A1 | 4/2000 |

OTHER PUBLICATIONS

International Preliminary Report on Patentability from counterpart International Application No. PCT/US2013/076234, dated Sep. 3, 2015, 6 pp.

(Continued)

*Primary Examiner* — Veronica F Faison
(74) *Attorney, Agent, or Firm* — Shumaker & Sieffert, P.A.

(57) ABSTRACT

In some examples, an apparatus includes a pallet supporting a plurality of workpieces, the pallet including through-holes structured to pass a quenching fluid. In some examples, the apparatus further includes a reservoir of quenching fluid configured to provide the quenching fluid, and a plurality of upturned wall portions extending from the pallet and substantially surrounding the exteriors of the plurality of workpieces. The plurality of upturned wall portions may be located in relative orientation to the plurality of workpieces to regulate heat transfer coefficients of the plurality of workpieces during a quenching operation.

7 Claims, 4 Drawing Sheets

(51) Int. Cl.
*C21D 11/00* (2006.01)
*C21D 1/64* (2006.01)

(56) References Cited

U.S. PATENT DOCUMENTS

| | | | | |
|---|---|---|---|---|
| 3,792,844 | A | * 2/1974 | Berry, III | C21D 1/667 |
| | | | | 266/117 |
| 4,278,421 | A | 7/1981 | Limque et al. | |
| 4,360,189 | A | * 11/1982 | Duncan | C21D 1/673 |
| | | | | 100/315 |
| 4,610,435 | A | 9/1986 | Pfau et al. | |
| 4,653,732 | A | 3/1987 | Wunning et al. | |
| 4,767,473 | A | 8/1988 | Berg | |
| 4,769,092 | A | 9/1988 | Peichl et al. | |
| 4,810,311 | A | 3/1989 | Economopoulos | |
| 4,938,460 | A | 7/1990 | Wechselberger et al. | |
| 5,419,792 | A | 5/1995 | King et al. | |
| 6,394,793 | B1 | * 5/2002 | Bunge | C21D 1/667 |
| | | | | 147/714 |
| 6,434,949 | B2 | 8/2002 | Botzler et al. | |
| 7,255,829 | B1 | 8/2007 | Peter et al. | |
| 2004/0182484 | A1 | * 9/2004 | Stratton | C21D 1/613 |
| | | | | 148/712 |
| 2005/0012250 | A1 | * 1/2005 | Rabinovich | C21D 1/56 |
| | | | | 266/46 |

OTHER PUBLICATIONS

International Search Report and Written Opinion for counterpart international application No. PCT/US2013/076234, dated Mar. 21, 2014, 9 pp.

* cited by examiner

WALL MEMBER USEFUL IN QUENCHING

This application claims the benefit of U.S. Provisional Application No. 61/767,123, filed Feb. 20, 2013, which is incorporated herein by reference in its entirety.

TECHNICAL FIELD

The present disclosure generally relates to thermal processing of workpieces.

BACKGROUND

Providing the ability to influence heat transfer during thermal processing of a workpiece, such as during a quench operation, remains an area of interest. Some existing systems have various shortcomings relative to certain applications. Accordingly, there remains a need for further contributions in this area of technology.

SUMMARY

In some examples, the disclosure describes an apparatus including a pallet supporting a plurality of workpieces, the pallet including through-holes structured to pass a quenching fluid, a reservoir of quenching fluid configured to provide the quenching fluid; and a plurality of upturned wall portions extending from the pallet and substantially surrounding the exteriors of the plurality of workpieces, the plurality of upturned wall portions located in relative orientation to the plurality of workpieces to regulate heat transfer coefficients of the plurality of workpieces during a quenching operation.

In some examples, the disclosure describes an apparatus including a supply of quenching fluid defining a fluid surface; a heat treatment platform having a top structured to support a workpiece and constructed of a material that permits the heat treatment platform to be heated to relatively high temperatures in a first operation and submerged within the quenching fluid in a second operation, the heat treatment platform defining a hole that extends from a bottom of the heat treatment platform to a top of the heat treatment platform and through which the quenching fluid can pass while the heat treatment platform is disposed in the relatively cool liquid, the workpiece positioned on the top of the platform and defining a bore in communication with the hole in the platform; a wall extending from the top of the heat treatment platform and located adjacent to the workpiece such that an interplay between the wall and the workpiece suppresses a cooling of the workpiece adjacent to the wall relative to a cooling in the bore of the workpiece, wherein the heat treatment platform and the fluid surface can be moved relative to each other to immerse the workpiece in the quenching fluid.

In some examples, the disclosure describes a method including loading a pallet with a workpiece; moving the pallet with the workpiece to a furnace for a heat treatment process; locating the workpiece proximate to a wall member that extends from the pallet to control a heat transfer coefficient of the workpiece, wherein the proximity of the wall member and the workpiece slows circulation of quenching fluid in a region between the wall member and the workpiece to affect a heat transfer coefficient in the region; and immersing the wall member and the workpiece within a quenching fluid as part of a quenching operation.

DETAILED DESCRIPTION

Figure 1:
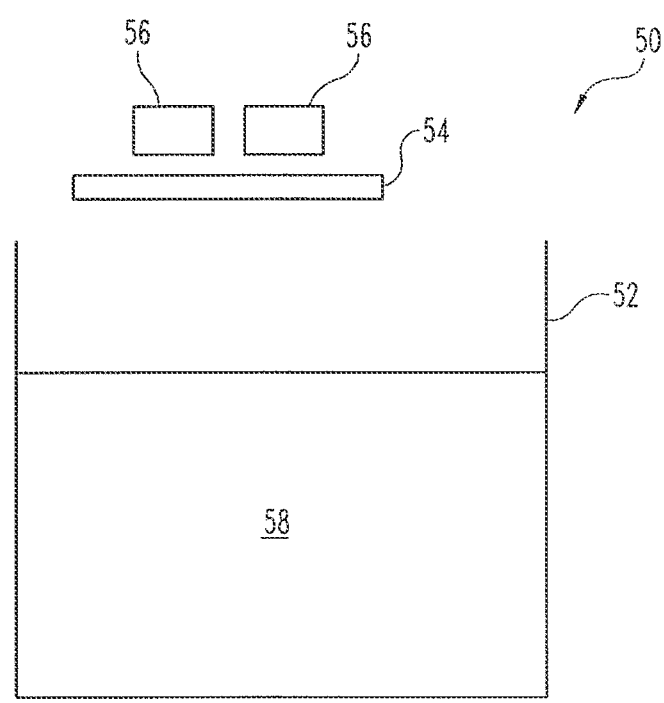
FIG. 1 is a conceptual diagram illustrating an example quenching device.

For the purposes of promoting an understanding of the principles of the disclosure, reference will now be made to the examples illustrated in the drawings and specific language will be used to describe the same. It will nevertheless be understood that no limitation of the scope of the disclosure is thereby intended. Any alterations and further modifications in the described examples, and any further applications of the principles of the disclosure as described herein are contemplated as would normally occur to one skilled in the art to which the disclosure relates.

FIG. 1 is a conceptual diagram illustrating an example quenching device 50. Quenching device 50 includes a quench tank 52, pallet 54, and a plurality of workpieces 56 placed upon pallet 54. Pallet 54 is used to lower the plurality of workpieces 56 into a quench fluid 58 located in the quench tank 52 so that a quenching operation can commence. In some examples, pallet 54 includes one or more passages therethrough that permit quench fluid 58 to pass as pallet 54 is lowered into quench tank 52. Though the illustrated example depicts a plurality of workpieces 56 placed upon pallet 54, in some embodiments a fewer or a greater number of workpieces 56 can be used with pallet 54 and quench tank 52.

The plurality of workpieces 56 can include any type of member that can be elevated to a relatively high temperature and thereafter subsequently immersed within the quenching fluid located in the quench tank. The temperatures to which the plurality of workpieces 56 are subjected can be intended for any variety of purposes, such as high temperature annealing. The plurality of workpieces 56 can be placed upon pallet 54 prior to high temperature processing and kept on pallet 54 while pallet 54 is transitioned to, and in some examples during, the quenching operation. In other examples, the plurality of workpieces 56 may not be placed upon pallet 54 prior to the high temperature processing. Relative movement of pallet 54 to quenching fluid 58 can be accomplished through action of any appropriate device. For example, pallet 54 can be moved in and out of quenching fluid 58 using an actuation device including, but not limited to, an elevator lift, hydraulic actuator, cable/pulley system, etc. In short, any number of forms sufficient to bring quenching fluid 58 into contact with the plurality of workpiece 56 can be used.

In some examples, the plurality of workpieces 56 placed upon the pallet can be identical in at least one of shape, size, composition, or the like. In other examples, the plurality of workpieces 56 may not be identical in at least one of shape, size, composition, or the like. The plurality of workpieces 56 can be metallic, or may include other materials. In some examples, the plurality of workpieces 56 can include gas turbine engine components such as turbomachinery rotors, but the plurality of workpieces 56 may include other components useful in gas turbine engines. The plurality of workpieces 56, furthermore, can be used in a variety of applications, one of which is as a component in a gas turbine engine useful to provide power to an aircraft. An example of the component that can be used in a gas turbine engine includes a disk.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present techniques are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Quenching fluid 58 can include a variety of compositions and can be thermally conditioned to an appropriate temperature for a quenching operation. For example, quenching fluid 58 can be heated to a temperature through use of a heating element that in some forms can maintain quenching fluid 58 at a temperature below that of the plurality of workpieces 56.

Quench tank 52 can be any suitable shape and size. In some examples, quench tank 52 is sufficiently large to accommodate a single pallet 54, while in other forms quenching tank 52 can be large enough to accommodate multiple pallets 54. In some examples, quench tank 52 can be coupled with fluid agitators that are configured to encourage flow of quench fluid 58 within quenching tank 52. One or more fluid agitator can be used. The agitators can take the form of a mechanical stirrer, one or more jets that propel quench fluid as a result of a pumping action, or the like. In some examples, fluid agitator can circulate quench fluid 58 in a given pattern and/or direction, but in other examples, the circulation may be irregular such as would be the case with turbulent agitation.

Figure 2:
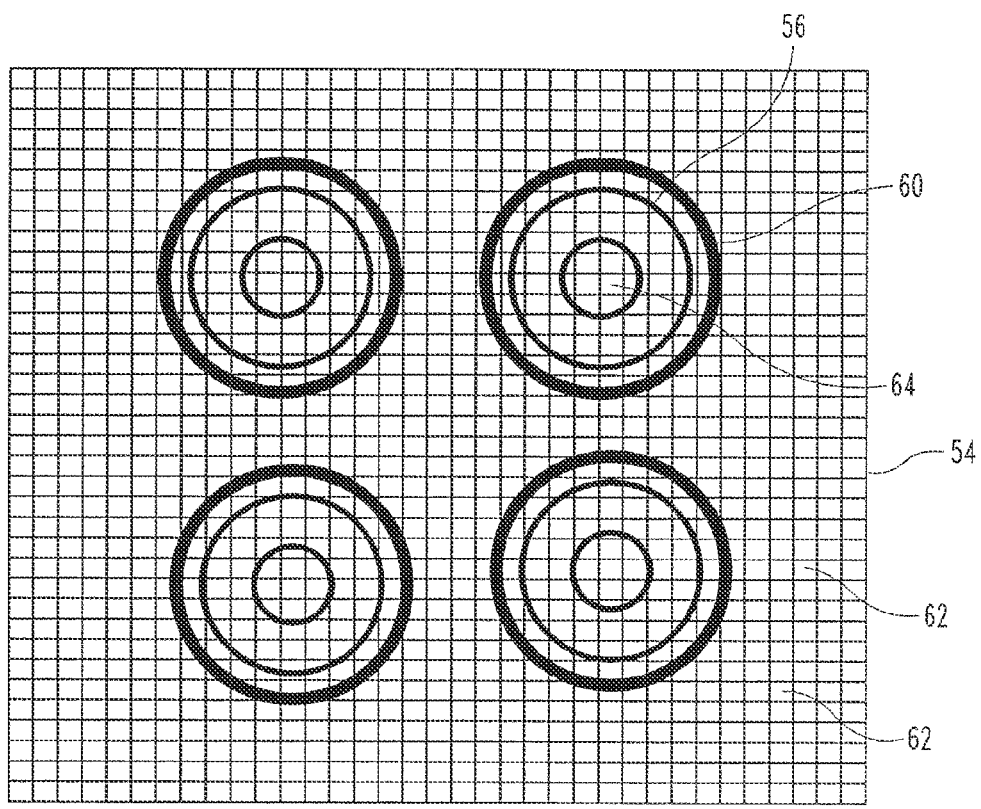
FIG. 2 is a conceptual diagram illustrating example workpieces and example wall members loaded onto a pallet.

FIG. 2 is a conceptual diagram illustrating example workpieces and example wall members loaded onto a pallet. In the example illustrated in FIG. 2, a number of workpieces 56 are placed onto a pallet 54 along with a wall member 60 that, in the illustrated example, surrounds the workpieces 56. Wall members 60 can be used to affect a heat transfer with workpieces 56 during the quench operation. In some examples, wall members 60 can be used in subsequent quenching operations. In the illustrated example, wall members 60 are shown as separate members each surrounding a respective one of workpieces 56. In some examples, one or more of wall members 60 can be coupled together. For example, a single wall member 60 can be used as a wall member for two adjacent workpieces 56.

In some examples, wall members 60 are unitary components. In other examples, wall members 60 can be built from separate components and fashioned into a wall member 60 suitable for use with pallet 54 and/or workpiece 56. Wall members 60 can be formed of a same or different material than either or both of workpieces 56 and pallet 54. In some examples, wall members 60 used in a given pallet arrangement can be identical, but in other examples, wall members 60 used in a given pallet arrangement may be non-identical. Other characteristics of wall members 60 are discussed below.

As can be seen in the example illustrated in FIG. 2, pallet 54 includes a number of passages 62 through which quench fluid 58 can flow. Passages 62 are shown as quadrilateral in the illustrated example, but may define different shapes in other examples. In some examples, respective ones of workpieces 56 and respective ones of wall members 60 each are disposed over a number of passages 62. Other example can include a density of passages 62 greater than or less than that shown in the illustrated example. Furthermore, though passages 62 used throughout any given pallet 54 can be identical in some examples, in other examples passages 62 may not be identical. In some examples, passages 62 can be regularly spaced as shown in the illustrated example, but in other examples, passages 62 can be irregularly spaced. In some examples, the passages 62 can be aligned with structure, such as a bore in a workpiece 56, but in other examples, passages 62 may not be aligned with structure. In some examples, more than one passage 62 can be placed in fluid communication, either in whole or in part, with a center bore 64 of a respective one of workpieces 56. In short, any number, configuration, sizes, shapes, or the like, of passages 62 can be provided in any given example.

Workpieces 56 are illustrated in FIG. 2 as an annular construction with a center bore 64. In other examples, workpieces 56 may define other shapes. In some examples, workpieces 56 may include an annular construction that is axisymmetric. In other examples, workpieces 56 may include other variations of shape.

Figure 3:
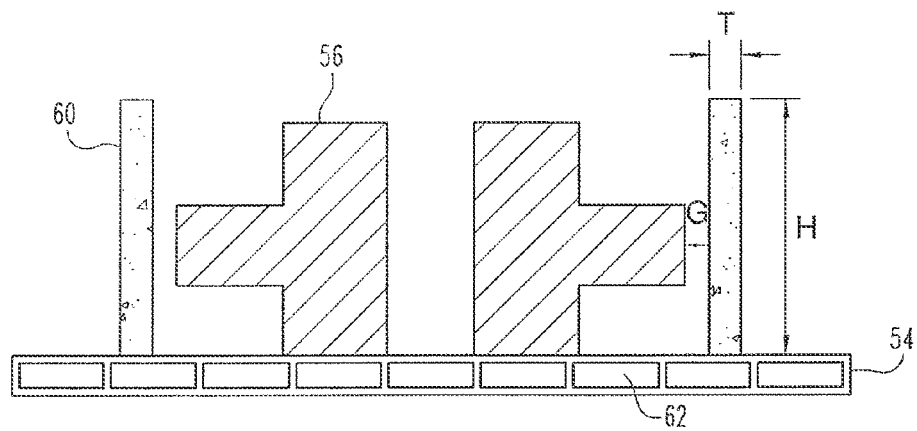
FIG. 3 is a conceptual and schematic diagram illustrating a view of an example wall member.

FIG. 3 is a conceptual and schematic diagram illustrating a view of an example wall member. In FIG. 3, workpiece 56 and wall member 60 are shown loaded onto pallet 54. The illustrated example depicts wall member 60 having a thickness T and a height H. Wall member 60 extends above workpiece 56 in the illustrated example. Wall member 60 can have a constant or variable thickness T as it extends around at least a portion (e.g., the entirety) of workpiece 56. The height H can also be constant, or can be variable, as wall member 60 extends around at least a portion (e.g., the entirety) of workpiece 56. As shown, the height H can be such that wall member 60 extends above the upper portion of workpiece 56, but not all examples need to include the same relationship of the height of workpiece 56 and the height H of wall member 60.

In some examples, wall member 60 can be a separate component that is placed upon pallet 54. Wall member 60 can be movable. The term movable, as used herein, is intended to broadly encompass any wall member 60 that might be displaced and is not permanently fixed in one place, position, or posture. In some examples, wall member 60 may be rotatable. In some examples, wall member 60 may be removable. Removable components are considered to be movable, but movable components are not necessarily removable.

As shown in FIG. 3, a gap G is provided between an outer portion of workpiece 56 and an inner surface of wall member 60. In some examples, the gap G can be the same along the entire length of wall member 60, but other examples, the gap G can vary along the length of wall member 60. Not all examples include a gap G of the nature depicted in FIG. 3, as can be seen in one or more examples described below.

Figure 4:
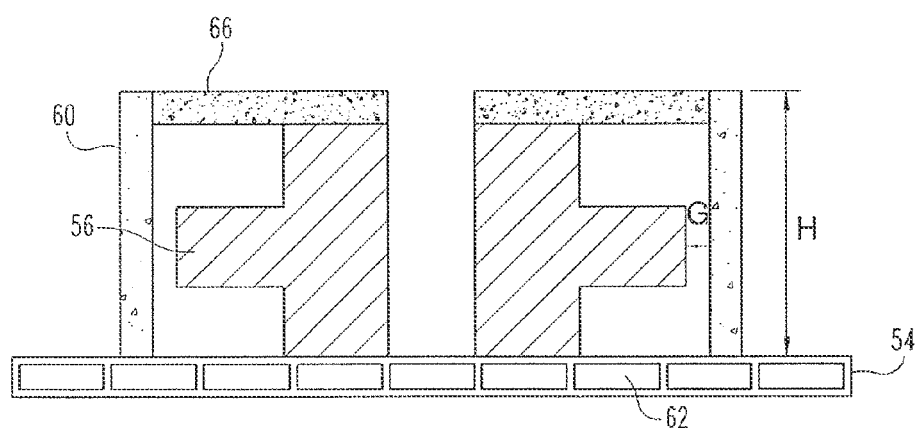
FIG. 4 is a conceptual and schematic diagram illustrating a view of an example wall member and template.

FIG. 4 is a conceptual and schematic diagram illustrating a view of an example wall member and template. As shown in FIG. 4, a template 66 is used to provide relative orientation between workpiece 56 and wall member 60. In some examples, template 66 can take a circular form consistent with the view shown in FIG. 2 of wall member 60 and workpieces 56, but in other examples, template 66 can take another shape, e.g., depending upon the relative orientation between wall member 60 and workpiece 56. For example, if workpiece 56 is not axisymmetric, template 66 can take a non-circular form. Though template 66 shown in the illustrated example depicts a single, relatively flat component, some examples of template 66 can include one or more components having one or more protrusions useful to provide relative orientation. Furthermore, though template 66 is shown being used above workpiece 56, some examples can include a template used in other locations. For example, template 66 include one or more template components used in conjunction with one another at the base of wall member 60 and/or workpiece 56 to provide a desired relative orientation between wall member 60 and workpiece 56. In some examples, template 66 can be moveable. In some examples, template 66 can be located with workpiece 56 and wall member 60 on pallet 54 during the quenching operation.

Figure 5:
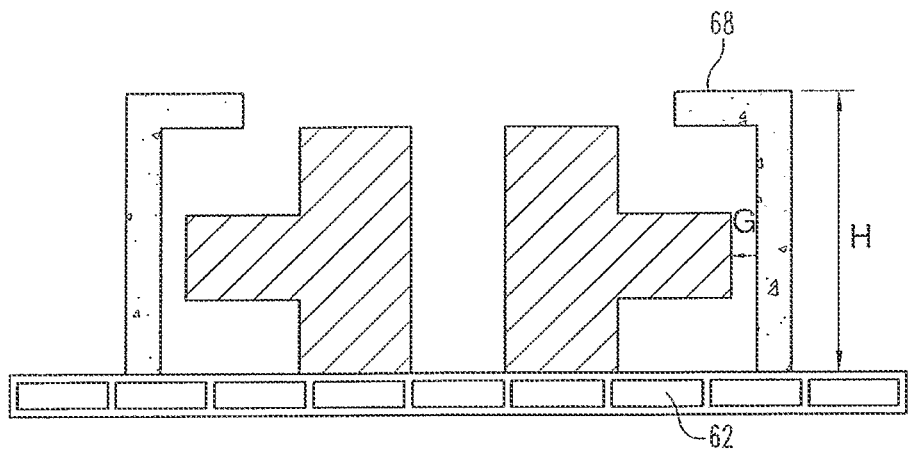
FIG. 5 is a conceptual and schematic diagram illustrating an example wall member.

FIG. 5 is a conceptual and schematic diagram illustrating an example wall member. In the example illustrated in FIG. 5 wall member 60 includes an overhang 68. Overhang 68 can take a variety of shapes and sizes and can extend from an upturned portion of wall member 60 any distance. Furthermore, in some examples, overhang 68 can extend a similar orientation from the upturned portion along the entirety of the wall member 60. In other examples, overhang 68 need not be the same along the length of wall member 60.

Figure 6:
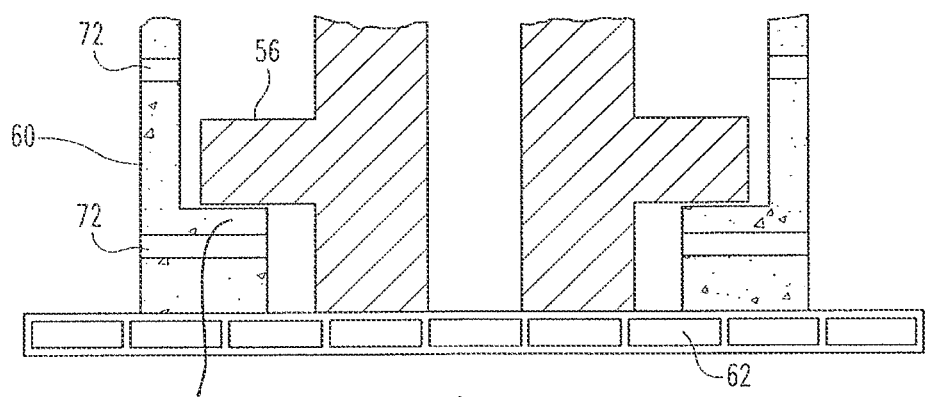
FIG. 6 is a conceptual and schematic diagram illustrating an example wall member.

FIG. 6 is a conceptual and schematic diagram illustrating an example wall member. FIG. 6 depicts wall member 60 including a shelf 70 upon which a portion of workpiece 56 can either rest or to which workpiece 56 can be located in close proximity. In some examples, shelf 70 can extend from the upturned portion of wall member 60 along the entirety of the length of wall member 60, but in other examples, shelf 70 may extend from the upturned portion of wall member 60 for a portion of the length of wall member 60. In some examples, wall member 60 may include one or more shelves 70, whether or not similarly situated, shaped, or the like.

In some examples, wall member 60 can also include wall passages 72 that permit quenching fluid 58 to be communicated therethrough. During a quenching operation quenching fluid 58 may vaporize if workpiece 56 and/or wall member 60 are of sufficiently high temperature. Wall passages 72 can allow such vaporized quenching fluid 58 to pass therethrough, thus relieving a gaseous buildup of quenching fluid 58.

Wall passages 72 can take on a variety of shapes and sizes. For example, wall passages 72 can have any variety of width and height that extend to a greater or lesser extent than that depicted. In some examples, wall passages 72 can be circular, but in other examples, wall passages 72 can include a different shape. In some examples, wall member 60 can include fewer or greater numbers of wall passages 72 than illustrated in FIG. 6.

As will be appreciated given the description herein, any of the above described examples can be combined to provide any variety of variations. For example, examples that include the overhang 68 (FIG. 5) can be combined with examples including shelf 70 (FIG. 6). As another example, passages 72 can be formed in any of the wall members 60 at any locations, and/or can be formed in template 66. Other combinations are also contemplated.

In some examples, one or more workpieces 56 can be placed upon a pallet 54 that includes one or more wall members 60 disposed in proximity to the one or more workpieces 56. Pallet 54, workpiece(s) 56, and wall member(s) 60 can be placed in a furnace for a high temperature process and can then collectively be moved and placed into contact with a quenching fluid 58 where wall member(s) 60 can be used to influence a heat transfer coefficient during the quenching operation. Such an ability to influence the heat transfer coefficient during can be used to control cooling in select areas of the one or more workpiece(s) 56. For example, the wall member(s) 60 can be used to restrain cooling at the outer reaches of the workpiece(s) 56 through, for example, constraining movement of the quench fluid 58, but the bore can be cooled relatively more rapidly because flowing of quenching fluid 58 through passage(s) 62 is not as constrained. In this way, in some examples, the relative configuration of wall member(s) 60 with one or more workpiece(s) 56, such as through adjusting the gap G, shelf 70, thickness T, height H, passages 72, or the like can be used to influence the heat transfer to and from workpiece(s) 56 during a quench operation.

In some examples, the disclosure describes an apparatus including a pallet supporting a plurality of workpieces, the pallet including through-holes structured to pass a quenching fluid, a reservoir of quenching fluid configured to provide the quenching fluid; and a plurality of upturned wall portions extending from the pallet and substantially surrounding the exteriors of the plurality of workpieces, the plurality of upturned wall portions located in relative orientation to the plurality of workpieces to regulate heat transfer coefficients of the plurality of workpieces during a quenching operation.

In some examples, respective upturned wall portions of the plurality of upturned wall portions are each included in a respective wall member of a plurality of wall members.

In some examples, each respective upturned wall portion of the plurality of upturned wall portions defines an annular shape.

In some examples, an overhang extends from at least one respective upturned wall portion of the plurality of upturned wall portions toward at least one of the workpieces.

In some examples, a respective upturned wall portion of the plurality of upturned wall portions is located in relative proximity to a respective workpiece of the plurality of workpieces, the relative proximity of the respective upturned wall portion and the respective workpiece discourages flow of the quenching fluid proximate to the exterior of the respective workpiece, and the respective workpiece is axisymmetric.

In some examples, at least one wall portion of the plurality of upturned wall portions includes an opening formed therethrough and having a height and width, the opening structured for conveyance of quenching fluid.

In some examples, the through-holes of the pallet are indexed in a predetermined orientation with bores formed in the respective workpieces of the plurality of workpieces.

In some examples, the disclosure describes an apparatus including a supply of quenching fluid defining a fluid surface; a heat treatment platform having a top structured to support a workpiece and constructed of a material that permits the heat treatment platform to be heated to relatively high temperatures in a first operation and submerged within the quenching fluid in a second operation, the heat treatment platform defining a hole that extends from a bottom of the heat treatment platform to a top of the heat treatment platform and through which the quenching fluid can pass while the heat treatment platform is disposed in the relatively cool liquid, the workpiece positioned on the top of the platform and defining a bore in communication with the hole in the platform; a wall extending from the top of the heat treatment platform and located adjacent to the workpiece such that an interplay between the wall and the workpiece suppresses a cooling of the workpiece adjacent to the wall relative to a cooling in the bore of the workpiece, wherein the heat treatment platform and the fluid surface can be moved relative to each other to immerse the workpiece in the quenching fluid.

In some examples, the workpiece comprises a plurality of workpieces, wherein the wall comprises a plurality of walls, and wherein respective walls of the plurality of walls are adjacent to respective workpieces of the plurality of workpieces.

In some examples, the respective walls are axisymmetric, further including plurality of index members structured to place the respective walls wall relative to the respective workpieces.

In some examples, the wall further includes a passage formed therethrough, and wherein the passage is structured to permit quenching fluid to pass therethrough.

In some examples, the wall includes a step over which an outer extremity of the workpiece extends.

In some examples, the wall and the workpiece are positioned relative to each other to provide a gap distance.

In some examples, a desired gap is provided by an index configured to set the gap distance between the workpiece and the wall.

In some examples, the disclosure describes an apparatus including a quenching base upon which is located a heated workpiece, a quenching fluid into which the quenching base is moved, and partition means for managing heat transfer coefficients such that a first portion of the heated workpiece is cooled at a slower rate than a second portion of the heated workpiece.

In some examples, the first portion is an outer portion of an axisymmetric workpiece and the second portion is an inner portion of the axisymmetric workpiece.

In some examples, the disclosure describes a method including loading a pallet with a workpiece; moving the pallet with the workpiece to a furnace for a heat treatment process; locating the workpiece proximate to a wall member that extends from the pallet to control a heat transfer coefficient of the workpiece, wherein the proximity of the wall member and the workpiece slows circulation of quenching fluid in a region between the wall member and the workpiece to affect a heat transfer coefficient in the region; and immersing the wall member and the workpiece within a quenching fluid as part of a quenching operation.

In some examples, the proximity of the wall member and the workpiece slows circulation of the quenching fluid in the region by constricting a flow path of quenching fluid between the wall member and the workpiece.

In some examples, the method further includes conveying the quenching fluid through a bore hole internal to the workpiece such that the bore hole is cooled rapidly relative to a portion of the workpiece that is in proximity to the wall member.

In some examples, the workpiece comprises a plurality of workpieces, the wall member comprises a plurality of annular wall members, and locating the workpiece proximate to the wall member includes locating respective annular wall members of the plurality of annular wall members proximate to respective workpieces of the plurality of workpieces.

In some examples, the method further includes indexing the workpiece relative to the wall member to provide for a preset orientation of the workpiece and the wall member.

In some examples, the method further includes conveying a vaporized quenching fluid through a passage formed in the wall member.

In some examples, conveying the vaporized quenching fluid through the passage formed in the wall member includes flowing the vaporized quenching fluid up toward an obstruction formed by the wall member and out through the passage formed in the wall member.

While the disclosure has been illustrated and described in detail in the drawings and foregoing description, the same is to be considered as illustrative and not restrictive in character, it being understood that only some examples have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a reservoir of quenching fluid configured to provide the quenching fluid;
   a pallet supporting a plurality of workpieces, the pallet including through-holes structured to pass the quenching fluid, wherein the pallet and plurality of workpieces are submerged in the reservoir of quenching fluid; and
   a plurality of upturned wall portions extending from the pallet and substantially surrounding the exteriors of the plurality of workpieces, the plurality of upturned wall portions located in relative orientation to the plurality of workpieces to regulate heat transfer coefficients of the plurality of workpieces during a quenching operation.

2. The apparatus of claim 1, wherein respective upturned wall portions of the plurality of upturned wall portions are each included in a respective wall member of a plurality of wall members.

3. The apparatus of claim 2, wherein each respective upturned wall portion of the plurality of upturned wall portions defines an annular shape.

4. The apparatus of claim 3, wherein an overhang extends from at least one respective upturned wall portion of the plurality of upturned wall portions toward at least one of the workpieces.

5. The apparatus of claim 1, wherein a respective upturned wall portion of the plurality of upturned wall portions is located in relative proximity to a respective workpiece of the plurality of workpieces, and wherein the relative proximity of the respective upturned wall portion and the respective workpiece discourages flow of the quenching fluid proximate to the exterior of the respective workpiece, and wherein the respective workpiece is axisymmetric.

6. The apparatus of claim 1, wherein at least one wall portion of the plurality of upturned wall portions includes an opening formed therethrough and having a height and width, the opening structured for conveyance of quenching fluid.

7. The apparatus of claim 1, wherein the through-holes of the pallet are indexed in a predetermined orientation with bores formed in the respective workpieces of the plurality of workpieces.

* * * * *